United States Patent [19]

Lee

[11] Patent Number: 5,548,969
[45] Date of Patent: Aug. 27, 1996

[54] METHOD FOR CONTROLLING ROTATION SPEED OF A COMPRESSOR FOR A REFRIGERATOR

[75] Inventor: Kun B. Lee, Uijongbu, Rep. of Korea

[73] Assignee: Samsung Electronics Co., Ltd., Suwon, Rep. of Korea

[21] Appl. No.: 405,783

[22] Filed: Mar. 17, 1995

[30] Foreign Application Priority Data

Mar. 31, 1994 [KR] Rep. of Korea .......................... 94-6762

[51] Int. Cl.$^6$ ................................................ F25B 49/02
[52] U.S. Cl. ............................................. 62/228.4; 62/131
[58] Field of Search ..................................... 62/131, 228.1, 62/228.4, 228.5, 157, 158, 231, 215, 208, 229

[56] References Cited

U.S. PATENT DOCUMENTS

| | | | |
|---|---|---|---|
| 5,003,785 | 4/1991 | Petri et al. .................................. | 62/131 |
| 5,065,587 | 11/1991 | Howland et al. ........................... | 62/131 |
| 5,255,530 | 10/1993 | Janke .................................. | 62/228.4 X |
| 5,263,332 | 11/1993 | Park ...................................... | 62/131 X |
| 5,460,009 | 10/1995 | Wills et al. ........................... | 62/228.4 X |

*Primary Examiner*—Harry B. Tanner
*Attorney, Agent, or Firm*—Burns, Doane, Swecker & Mathis, L.L.P.

[57] ABSTRACT

A method for controlling the rotation speed of a compressor for a refrigerator according to the frequency of use of the refrigerator. According to the control method, when the number of times or the cumulative time that the refrigerator doors are opened during a first predetermined time interval exceeds a respective reference value, the rotation speed of the compressor is increased. When the doors remain closed for a second predetermined time period, the rotation speed of the compressor is decreased.

4 Claims, 7 Drawing Sheets

METHOD FOR CONTROLLING ROTATION SPEED OF A COMPRESSOR FOR A REFRIGERATOR

BACKGROUND

1. Field of the Invention

The present invention is related to a method for controlling the rotation speed of a compressor, and particularly to a method for controlling the rotation speed of a compressor for a refrigerator based on the number and accumulated time interval of door openings.

2. Description of the Art

As is well known, a refrigerator is an appliance which preserves food at low temperature by cooling a definite space by the evaporation heat of a liquified gas. To effectively execute the afore-mentioned action, the refrigerator includes a refrigerating cycle which repeats four actions of compression, condensation, expansion, evaporation. An enclosed compressor is used in executing the compression action. The enclosed compressor is formed of an electric motor and a piston (in case of a reciprocating compressor) respectively arranged in an air-tight housing.

In the afore-mentioned configuration, as the axis of the motor is rotated, the piston connected thereto reciprocally moves within the air-tight housing, thereby inhaling and then compressing refrigerant. The compressed refrigerant is then discharged from the air-tight housing to execute the next action, that is, condensation action.

FIG. 1 is a block diagram of a conventional control apparatus for a refrigerator. Referring to FIG. 1, a conventional control apparatus for a refrigerator may include a temperature sensing section 20 for sensing the temperature of a freezing compartment, a door sensing section 30 for sensing the opening and closing state of the freezing compartment door, a compressor driving section 40 for driving the compressor, a fan driving section 50 for driving a fan which circulates cold air generated from an evaporator (not shown) in the freezing and refrigerating compartments, and a control section 10 for controlling the whole operation of the refrigerator.

In the control apparatus having the afore-mentioned configuration, when the temperature of the freezing compartment sensed by temperature sensing section 20 is higher than a set value, the control section 10, normally embodied by a microprocessor, outputs a control signal to the compressor driving section 40 so that the compressor may be activated. However, when the temperature of the freezing compartment is lower than the set value by the activation of the compressor, the control section 10 outputs control signals to the compressor driving section 40 and fan driving section 50 so that the activation of the compressor and fan may be stopped. Here, the fan is controlled to be stopped the moment the freezing compartment door is opened, whereas the compressor is controlled according to the temperature of the freezing compartment regardless of the opening and closing state of the freezing compartment door.

However, the conventional control apparatus for a refrigerator has a problem in that it cannot rapidly lower the temperature of the freezing compartment although the user lowers the set temperature of the freezing compartment in order to cancel the increase in the temperature of the freezing compartment caused by the frequent use of the refrigerator. For example, although the user selects a so-called "rapid freezing operation", the activation time interval of the compressor is merely lengthened without changing the rotation speed of the compressor, that is, the refrigerating capacity. This problem is caused by a fact that the conventional compressor is embodied by an A.C. motor driven by a commercial A.C. power supply source.

Furthermore, the conventional control apparatus has a problem in that the increase in the temperature of a refrigerating compartment which is caused by the frequent use of the refrigerator cannot be actually prevented because the activation of the compressor is controlled according to only the temperature of the freezing compartment.

SUMMARY

It is an object of the present invention to provide a method for increasing the rotation speed of a compressor in a refrigerator when either the number or accumulated time interval of door opening reaches a respective reference value, preventing food degeneration.

It is another object of the present invention to provide a method for decreasing the rotation speed of a compressor in a refrigerator when an uninterrupted door closing time interval reaches a reference value, thereby lowering electric power consumption in a refrigerator.

To achieve these objects, an exemplary control method according to the present invention may be applied to a compressor which can vary the rotation speed thereof. The control method comprises the steps of comparing the total number $N_O$ and accumulated time interval $t_O$ of both freezing compartment door and refrigerating compartment door opening for a predetermined time interval $t_R$ with respective reference values $N_{OR}$ and $t_{OR}$; maintaining the rotation speed of the compressor at a set value both when the accumulated time interval $t_O$ of door opening is not greater than the reference value $t_{OR}$ and when the number $N_O$ of door openings is less than the reference value $N_{OR}$; and, increasing the rotation speed of the compressor by a predetermined value when the accumulated time interval $t_O$ of door openings is greater than the reference value $t_{OR}$ or when the number $N_O$ of door openings is not less than the reference value $N_{OR}$.

According to the control method of an exemplary present invention, it is possible to rapidly decrease the temperatures of the freezing compartment and refrigerating compartment increased by the frequent use of the refrigerator. At this time, the compressor is controlled to be stopped only when the respective temperatures $T_F$ and $T_R$ of the freezing compartment and refrigerant compartment are not higher than respective set values $T_{FS}$ and $T_{RS}$.

In addition, both when the accumulated time interval $t_O$ of door openings is not greater than the reference value $t_{OR}$ for the predetermined time interval $t_R$ and when the number $N_O$ of door openings is less than the reference value $N_{OR}$ for the predetermined time interval $t_R$, the control method of the present invention may further comprise the steps of counting the uninterrupted time interval $t_C$ of door closing, and decreasing the rotation speed of the compressor by a predetermined value when the uninterrupted time interval $t_C$ is greater than a reference value $t_{CR}$.

BRIEF DESCRIPTION OF THE DRAWINGS

The present invention will become more readily apparent from the following description in connection with the accompanying drawings wherein.

DETAILED DESCRIPTION

For a better understanding of the present invention, together with other and further objects, advantages and capabilities thereof, reference is made to the following disclosure in connection with the above-described drawings.

Figure 1:
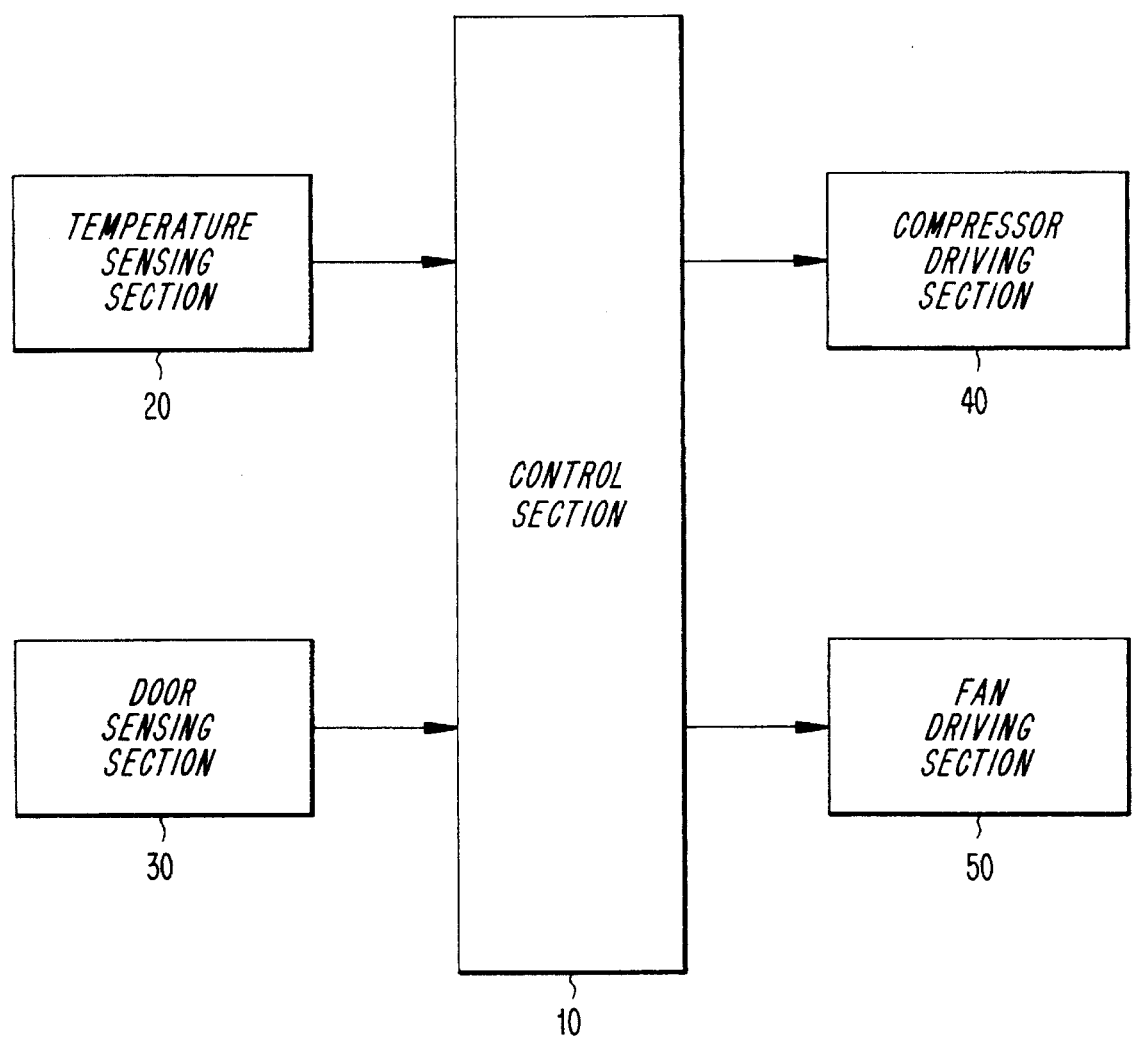
FIG. 1 is a block diagram of a conventional control apparatus for a refrigerator.
Figure 2:
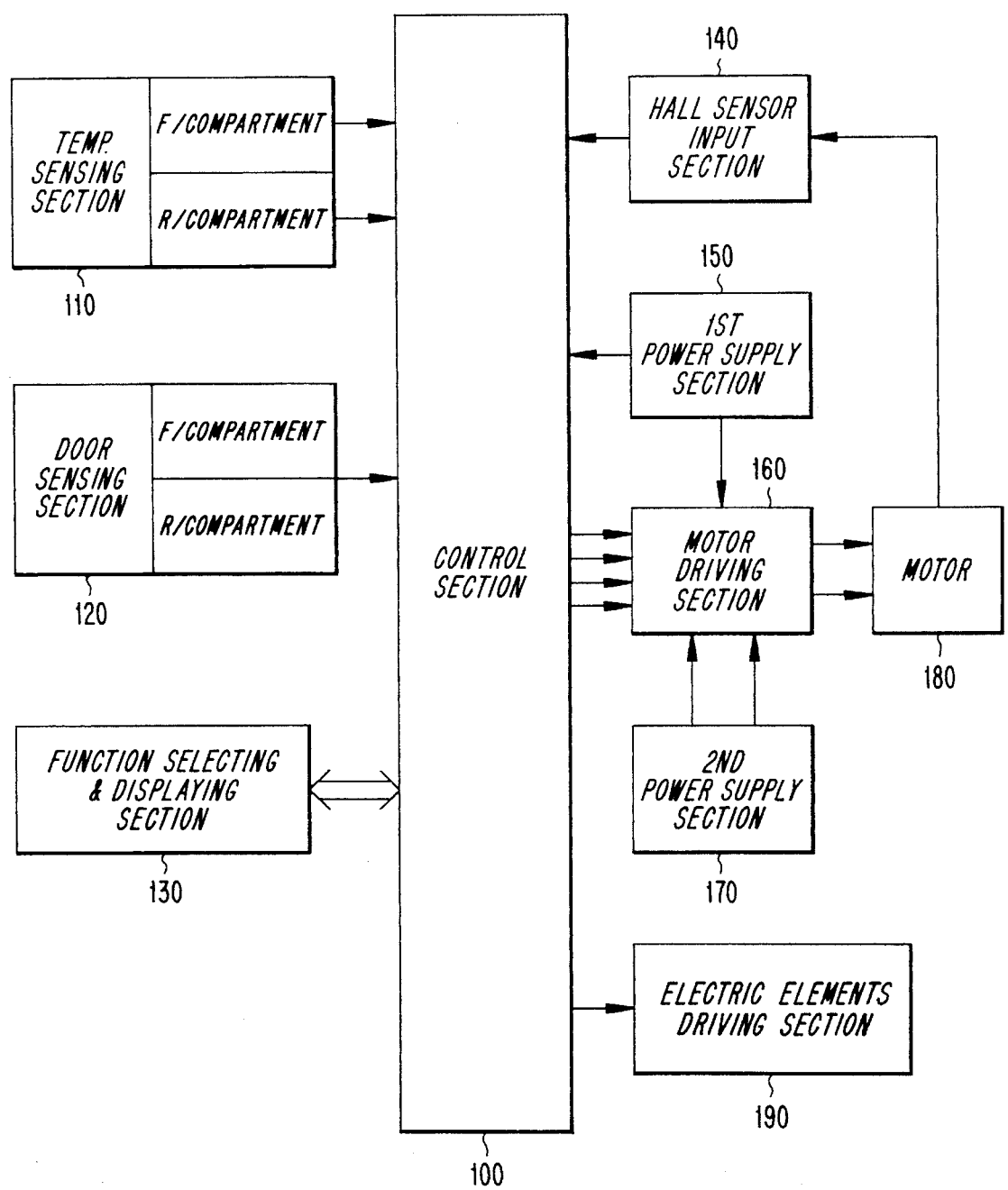
FIG. 2 is a block diagram for a control apparatus for a refrigerator according to a preferred embodiment of the present invention.

FIG. 2 is a block diagram for a control apparatus of a refrigerator according to a preferred embodiment of the present invention.

Referring to FIG. 2, the control apparatus applicable to the control method of the present invention comprises a control section 100 for controlling the whole operation of the refrigerator by the control program described hereinafter, a temperature sensing section 110 for sensing the temperatures $T_F$ and $T_R$ of a freezing compartment and refrigerating compartment of a refrigerator; a door sensing section 120 for sensing the opening or closing state of the freezing compartment and refrigerating compartment; a function selecting and displaying section 130 for selecting one or more among various functions including desired temperatures $T_{FS}$ and $T_{RS}$ of the freezing compartment and refrigerating compartment and for displaying the operation state of the refrigerator; a brushless motor 180 arranged in an enclosed housing (not shown) of the compressor and being capable of varying the rotation speed thereof; a Hall sensor input section 140 for detecting a specific magnetic pole of the rotor and thereby detecting the rotation speed of the brushless motor, and transmitting them to the control section 100; a first power supply section 150 for supplying electric power to each of electronic elements including the control section 100; a second power supply section 170 for supplying electric power to the brushless motor 180; and a motor driving section 160 operated by pulse width modulated signals controlling the activation of the respective phase winding of the brushless motor 180, and flowing A.C. current through the respective phase winding by switching a D.C. power supply of the second power supply section 170.

Figure 3A:
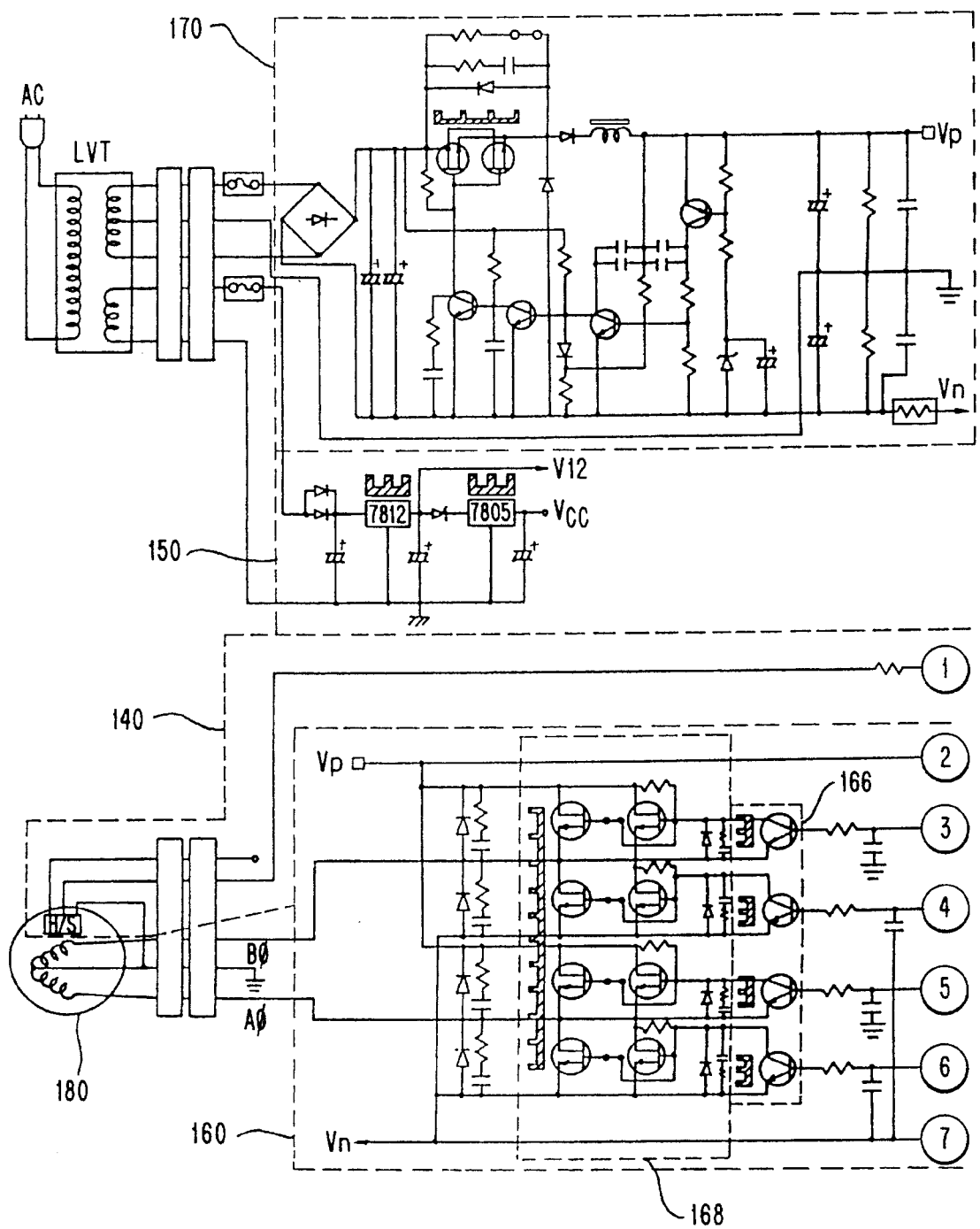
FIGS. 3A and 3B are concrete circuit diagrams for a control apparatus for a refrigerator to which the method of the present invention may be applied; and, FIGS. 4A to 4C are flow charts explaining a control method according to a preferred embodiment of the present invention.
Figure 3B:
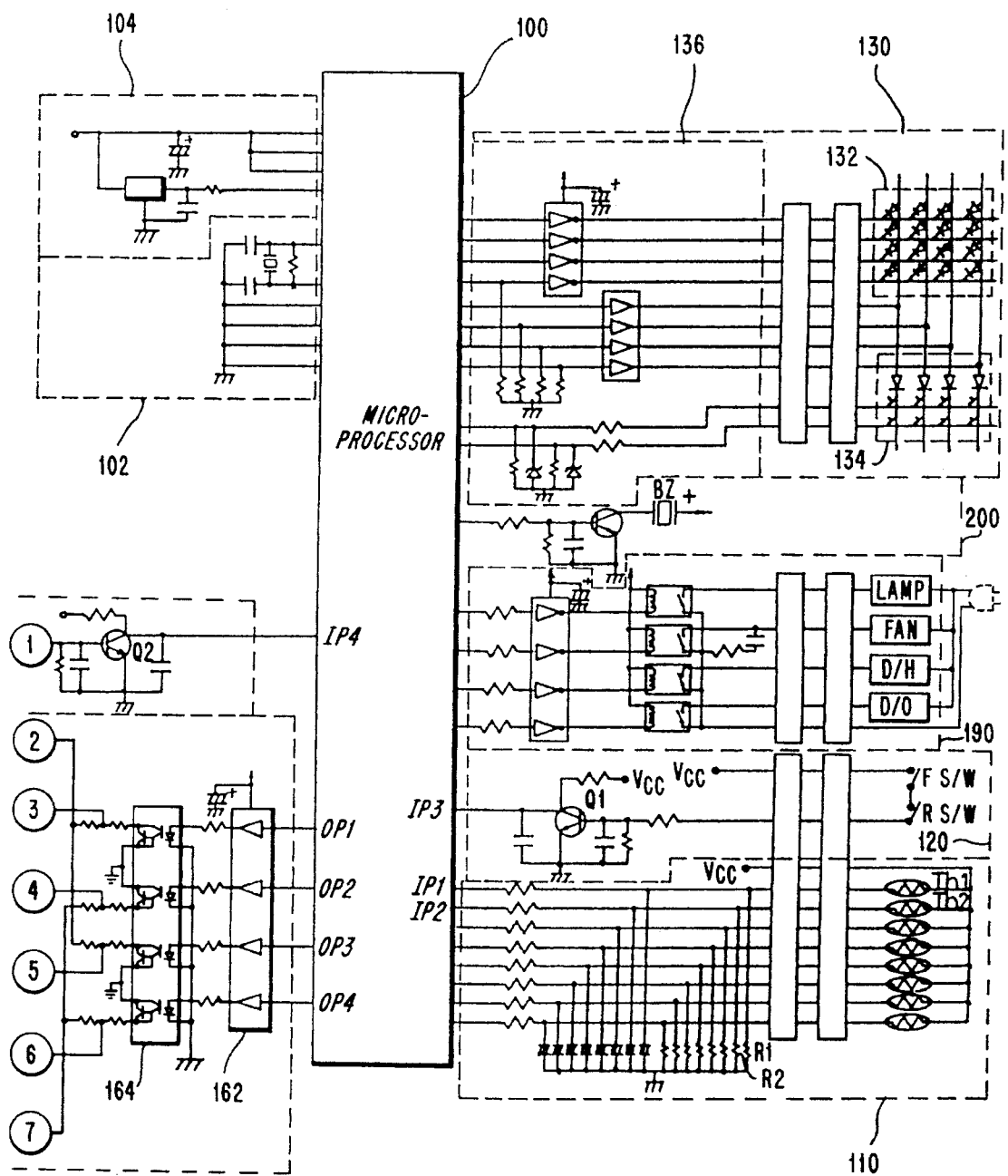

FIGS. 3A and 3B are concrete circuit diagrams for a control apparatus for a refrigerator to which the method of the present invention may be applied.

Referring to FIGS. 3A and 3B, the control section 100 is preferably embodied by a microprocessor.

The temperature sensing section 110 includes thermistors Th1 and Th2 and dividing resistors R1 and R2 respectively connected to a power supply source Vcc. The respective junction of the thermistors and dividing resistors Th1 and R1, Th2 and R2 are connected to the respective input terminal IP1 and IP2 of the microprocessor 100. The microprocessor 100 determines the temperatures $T_F$ and $T_R$ of the freezing compartment and refrigerating compartment after receiving voltage variation at the respective junction of the thermistors and dividing resistors Th1 and R1, Th2 and R2.

The door sensing section 120 includes door switches FS/W and RS/W for freezing compartment and refrigerating compartment, and a transistor Q1 turned on/off according to the opening or closing state of either of the freezing compartment and refrigerating compartment. The door switches FS/W and RS/W are connected in series between the power supply source Vcc and the base terminal of a transistor Q1. The collector terminal of the transistor Q1 is connected to the power supply source Vcc and an input terminal IP3 of the microprocessor 100. According to the afore-mentioned configuration, although one of the freezing compartment and refrigerating compartment is opened, the microprocessor 100 performs a required operation after receiving the voltage level at the collector terminal of the transistor Q1. For example, the microprocessor 100 counts the number or accumulated time interval of door openings.

The function selecting and displaying section 130 includes a LED display 132 for displaying the operation state of the refrigerator, a key matrix 134 for selecting any desired function, and a driving circuit 136 for driving these elements. The user may select a desired temperature(s) $T_{FS}$ or $T_{RS}$ of the freezing compartment or refrigerating compartment, or a desired operation intensity among "rapid freezing operation", "normal operation" and "energy-saving operation" through the key matrix 134 of the function selecting and displaying section 130.

The first power supply section 150 converts a commercial A.C. power supply source A.C. into D.C. power supply sources Vcc and V12, and then supplies it to each electronic element of the control apparatus.

The second power supply section 170 properly lowers the commercial A.C. power supply source A.C., converts the lowered power supply source into D.C. power supply source, and then supplies it to the motor driving section 160.

The motor 180 may be embodied by a two phase brushless motor, in which a rotor (not shown) is formed of a permanent magnet and a stator is formed of two phase windings Aφ and Bφ. A Hall sensor H/S is disposed in the vicinity of the rotor.

The Hall sensor input section 180 includes the Hall sensor H/S and a transistor Q2. The collector terminal of the transistor Q2 is connected to an input terminal IP4 of the microprocessor 100. The Hall sensor H/S induces Hall voltage varied according to the rotation of the rotor of the brushless motor 180, thereby turning the transistor Q2 on or off. Next, the microprocessor 100 recognizes the location of the specific magnet pole of the rotor and calculates the rotation speed of the rotor based on the variation in the voltage level of the collector terminal of the transistor Q2, and then outputs PWM signals to a motor driving section 160 through output terminals OP1 to OP4 thereof.

The motor driving section 160 includes a buffer circuit 162 and photo-coupler circuit 164 which are necessary for removing interference caused by the direct connection of the output terminals OP1 to OP4 of the microprocessor 100 and to the motor driving section, a power transistor circuit 166 for amplifying the PWM signals produced from the microprocessor 100, and a MOSFET circuit 168 for alternatively energizing the phase windings Aφ and Bφ. The MOSFET circuit 168 is connected to each of the phase windings Aφ and Bφ of the brushless motor 180 in pairs.

In the control apparatus for a refrigerator described above, the microprocessor 100 produces PWM signals so that the compressor may be driven until the temperatures $T_F$ and $T_R$ of the freezing compartment and refrigerating compartment transmitted from the temperature sensing section 110 reaches the respective set temperature $T_{FS}$ and $T_{RS}$.

In more detailed explanation, the microprocessor 100 recognizes the location of the specific magnet pole of the rotor based on the signal transmitted from the Hall sensor input section 140, and then outputs PWM signals having different phases to the motor driving section 160 to continuously rotate the rotor. The power transistors 166 and MOSFETs are appropriately turned on and off, thereby intermittently providing electric power Vp and Vn to the respective phase winding A$\phi$ and B$\phi$ of the brushless motor 180. As a result, the respective phase winding A$\phi$ and B$\phi$ of the brushless motor 180 is alternatively energized, thereby creating rotation magnetic field. Accordingly, the rotor can continuously rotate.

On the other hand, the microprocessor 100 also calculates the rotation speed of the brushless motor 180 by counting the signal transmitted from the Hall sensor input section 140. Next, the microprocessor 100 identifies the kind of the operation intensity selected by the user, for example, one among "rapid freezing operation", "normal operation", and "energy-saving operation", and then increases or decreases the rotation speed of the brushless motor 180 by producing appropriate PWM signals, the respective pulse width of which is increased or decreased based on the kind of the operation intensity. Here, the microprocessor 100 previously stores the rotation numbers corresponding to the kind of respective operation intensity.

In FIGS. 3A and 3B, reference numeral 190 denotes an electric element driving section for driving various electric elements such as an air circulation fan FAN, electric lamp LAMP, defrost heater D/H, deodorizer D/O and the like, and reference numeral 200 denotes an alarm issuing section for alerting the user to an abnormal operation state of the refrigerator. Furthermore, reference numerals 102 and 104 respectively denote a clock circuit and reset circuit.

Hereinafter, the control method of the present invention will be described in detail.

Figure 4A:
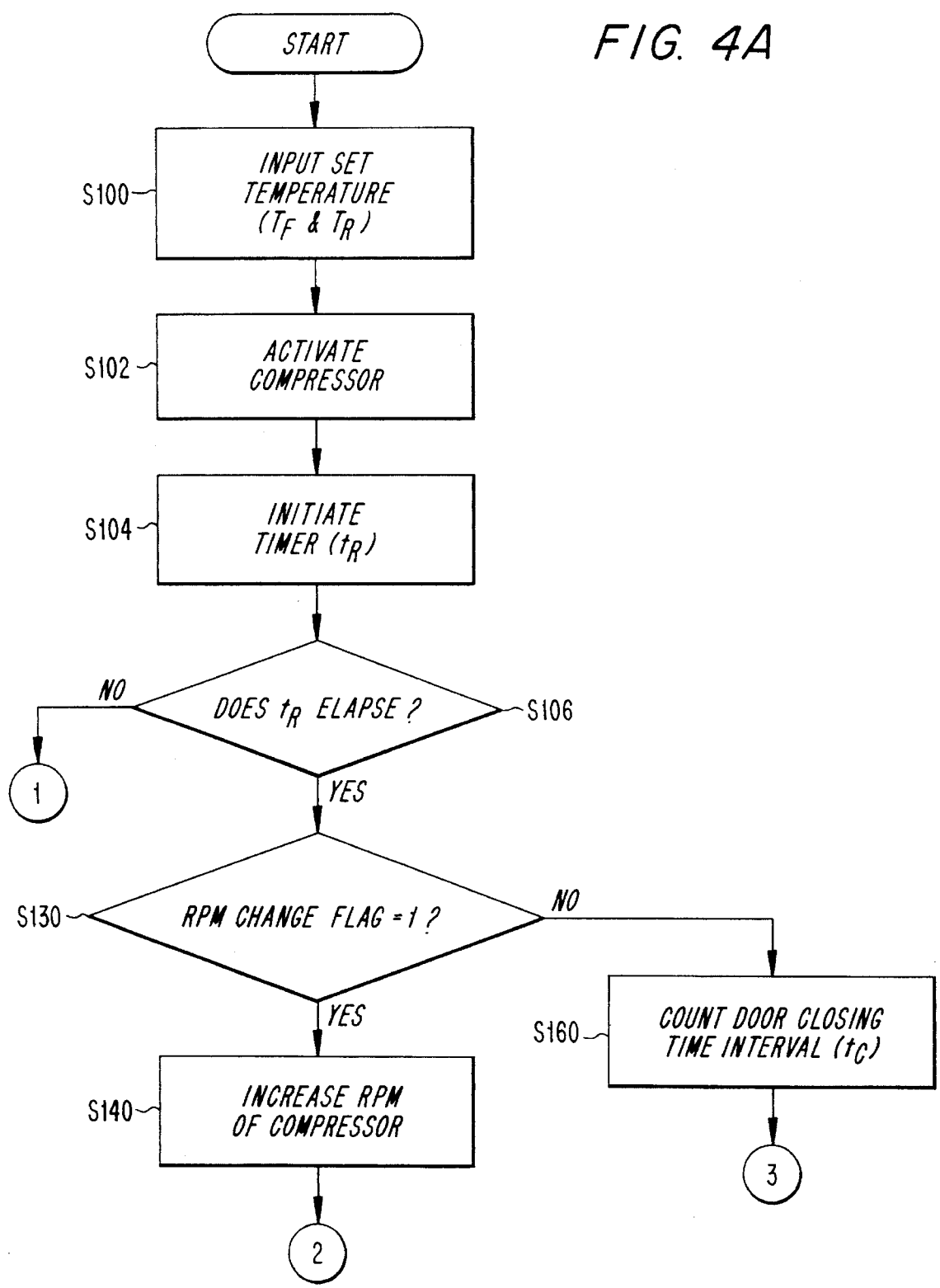
Figure 4B:
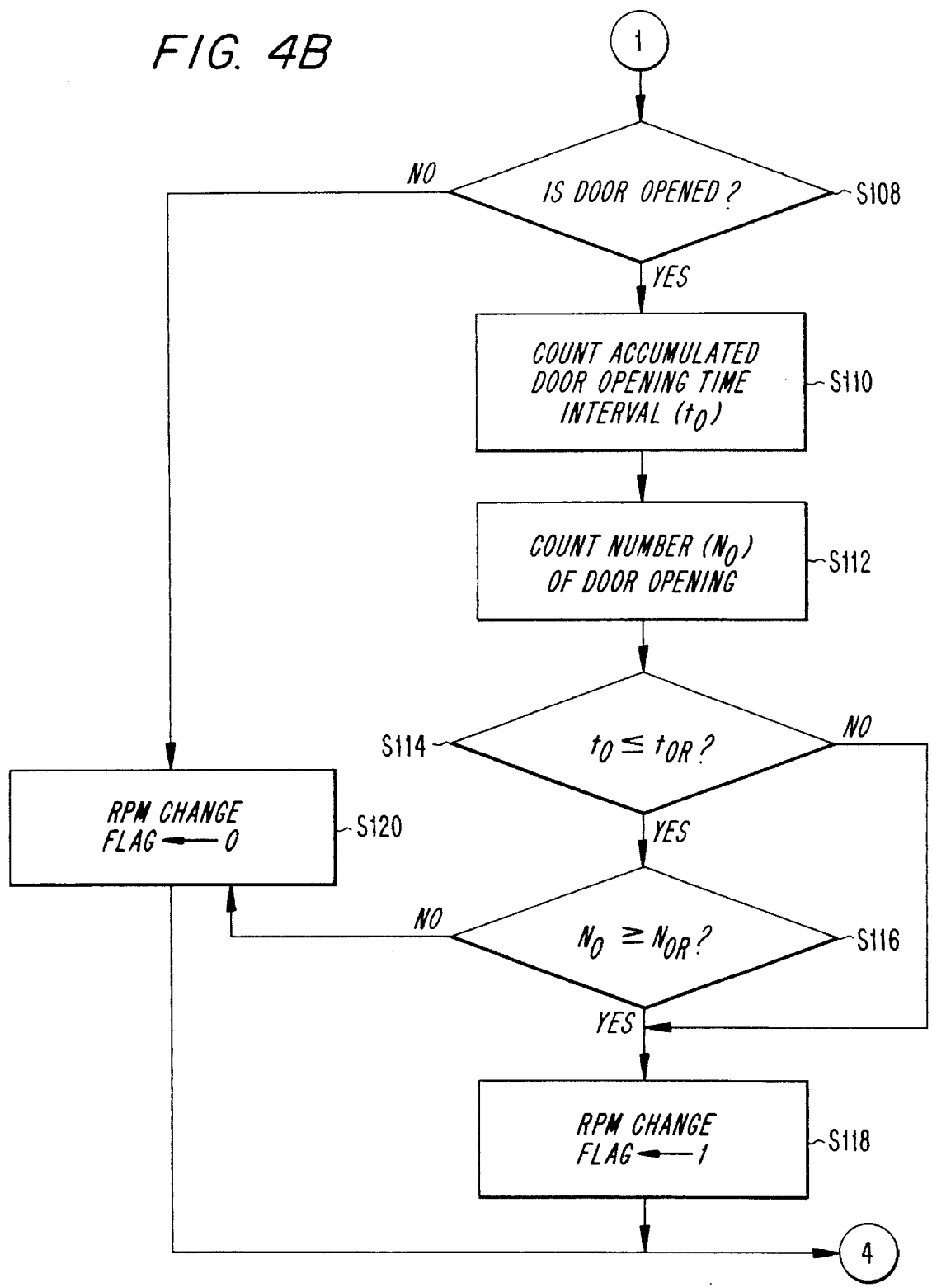
Figure 4C:
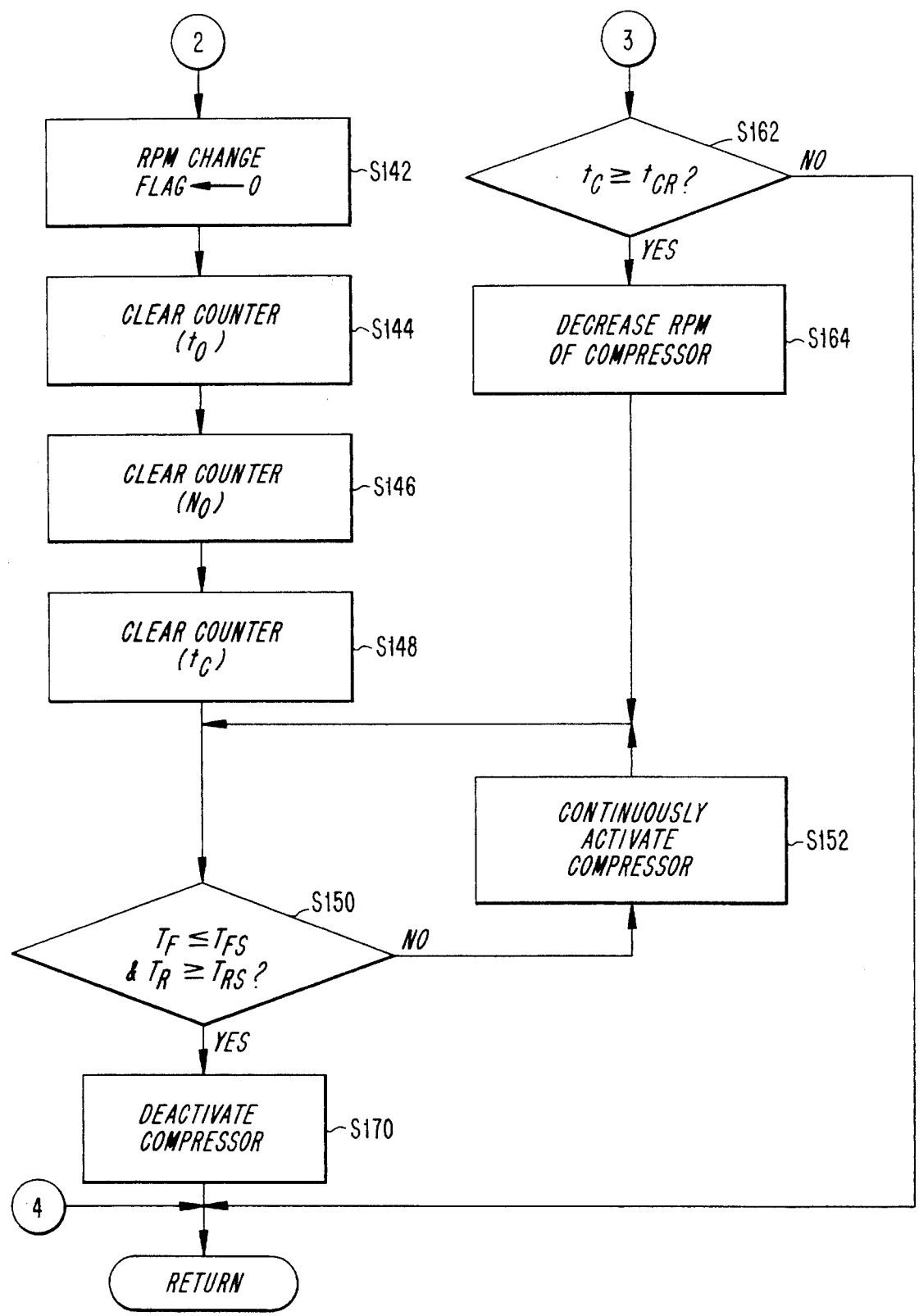

FIGS. 4A to 4C are flow charts explaining a control method according to a preferred embodiment of the present invention.

In step S100, the microprocessor 100 receives set temperatures $T_{FS}$ and $T_{RS}$ of freezing compartment and refrigerating compartment and an operation intensity, for example one among "rapid freezing operation", "normal operation" and "energy-saving operation" which the user selects through the function selecting and displaying section 130. Here, when "normal operation" is selected, the compressor may be driven at a normal speed, for example 3400 RPM; when "rapid freezing operation" is selected, the compressor may be driven at a high speed, for example 3800 RPM; and when "energy-saving operation" is selected, the compressor may be driven at a low speed, for example 3000 RPM. In the present embodiment, assuming that the temperature $T_{FS}$ of the freezing compartment is set at $-18°$ C., the temperature $T_{RS}$ of the refrigerating compartment is set at $3°$ C., and "normal operation" is selected, a detailed description will be presented. In step S102, the microprocessor 100 produces PWM signals through the output terminals OP1 to OP4 to drive the compressor at 3400 RPM corresponding to the normal operation in the state where either the main power is supplied or the well-known defrost operation is conducted. Furthermore, the air circulation fan FAN is also driven to circulate the cold air generated from a well-known evaporator (not shown) through the freezing compartment and refrigerating compartment.

At the same time, the microprocessor 100 initiates a timer ($t_R$) which clocks a predetermined time interval $t_R$, for example, thirty minutes in step S104. Next, the microprocessor 100 determines whether or not the predetermined time interval $t_R$ elapses in step S106. These steps S104 and S106 are required for providing a reference in subsequently calculating the number $N_O$ and accumulated time interval $t_O$ of door opening. When the predetermined time interval $t_R$ does not elapse in step S106, the program proceeds to step S108, in which the microprocessor 100 determines whether or not either freezing compartment or refrigerating compartment is opened. When both the freezing compartment and refrigerating compartment are not opened in step S108, the program proceeds to step S120, in which the microprocessor 100 resets a status flag for RPM change, provided therein. When either of the freezing compartment and refrigerating compartment is opened in step S108, the microprocessor 100 consecutively performs steps S110 and S112, in which the accumulated time interval $t_O$ and number $N_O$ of door openings are counted. The count operations in steps S110 and S112 are executed against the freezing compartment and refrigerating compartment. The conventional control apparatus for a refrigerator controls the activation of the compressor based on only the temperature $T_F$ of the freezing compartment because it is impossible to increase the rotation speed of the compressor. However, the novel control apparatus for a refrigerator according to an exemplary embodiment of the invention increases the rotation speed of the compressor when either of the temperatures $T_F$ and $T_R$ of the freezing compartment and refrigerating compartment is higher than the respective set temperature $T_{FS}$ and $T_{RS}$ because it is possible to change the rotation speed of the compressor, thereby rapidly decreasing the temperatures $T_F$ and $T_R$ of the freezing compartment and refrigerating compartment below the respective set temperature $T_{FS}$ and $T_{RS}$.

In step S114, the microprocessor 100 determines whether or not the accumulated time interval $t_O$ is not greater than a reference value $t_{OR}$. When the accumulated time interval $t_O$ is not greater than the reference value $t_{OR}$, for example three minutes in step S114, the program proceeds to step S116, in which the microprocessor 100 determines whether or not the number $N_O$ is not less than a reference value $N_{OR}$. When the number $N_O$ is not less than the reference value $N_{OR}$, for example five in step S116, the program proceeds to step S118, in which the microprocessor 100 sets the RPM change flag.

On the other hand, when the accumulated time interval $t_O$ is not greater than the reference value $t_{OR}$ in step S114 and when the number $N_O$ is less than the reference value $N_{OR}$, the program proceeds to step S120, in which the microprocessor 100 resets the RPM change flag. When the predetermined time interval $t_R$ elapses in step S106 in the course of repeating the proceeding steps, the program proceeds to step S130, in which the microprocessor 100 determines whether or not the RPM change flag is set. When the microprocessor 100 determines that the RPM change flag is set in step S130, the program proceeds to step S140, in which the rotation speed of the compressor is increased to a predetermined value, for example, 3800 RPM corresponding to that of the "rapid freezing operation". That is, the microprocessor 100 lengthens the respective pulse width of the PWM signals to be provided to the load driving section 160, thereby increasing the rotation speed of the brushless motor 180.

In step S142, the microprocessor 100 resets the RPM change flag, clears the counter ($t_O$) for counting the accumulated time interval $t_O$ in step S144, clears the counter ($N_O$) for counting the number $N_O$ in step S146, and clears a counter ($t_C$) for counting the uninterrupted time interval $t_C$ of door closing in step S148. The steps S142 to S148 are necessary for the next counting operations. In step S150, the microprocessor 100 determines whether or not the temperatures $T_F$ and $T_R$ of the freezing compartment and refrigerating compartment reach the respective set temperature $T_{FS}$ and $T_{RS}$ every predetermined time interval. When both the temperatures $T_F$ and $T_R$ of the freezing compartment and refrigerating compartment are less than the respective set temperature $T_{FS}$ and $T_{RS}$ in step S150, the program proceeds to step S170, in which the compressor and air circulating fan FAN are deactivated. When either of the temperatures $T_F$ and $T_R$ of the freezing compartment and refrigerating compartment is greater than the respective set temperature $T_{FS}$ and $T_{RS}$ in step S150, the program proceeds to step S152, in which the compressor and air circulating fan FAN are continuously activated.

By the afore-mentioned steps, the temperatures $T_F$ and $T_R$ of the freezing compartment and refrigerating compartment, which are increased by the frequent use of the refrigerator, are rapidly decreased to the respective set temperatures $T_{FS}$ and $T_{RS}$ within a short time interval.

On the other hand, when the microprocessor 100 determines that the RPM change flag is reset in step S130, the program proceeds to step S160, in which the microprocessor 100 counts a uninterrupted time interval $t_C$ of door closing. In step S162, the microprocessor 100 compares the magnitude of the uninterrupted time interval $t_C$ with a reference value $t_{CR}$, for example, two hours. When the uninterrupted time interval $t_C$ is not less than the reference value $t_{CR}$ in step S162, the program proceeds to step S164, in which the rotation speed of the compressor is decreased to a predetermined value, for example 3000 RPM corresponding to that of the "energy-saving operation". That is, the microprocessor 100 lessens the respective pulse width of the PWM signals to be provided to the load driving section 160, thereby decreasing the rotation speed of the brushless motor 180.

According to the afore-mentioned steps, it is possible to save electric power during the dead of night, at which time the refrigerator is hardly used, by decreasing the rotation speed of the compressor.

Several reference values are used in the method described above, that is, the predetermined time interval $t_R$, the number $N_O$ and accumulated time interval $t_O$ of door openings, the uninterrupted time interval $t_C$ of door closing, and the respective rotation speed of the compressor corresponding to that of the respective operation intensity.

The control method of the present invention may be applied not only to the compressor embodied by a brushless motor, but also to a compressor embodied by an induction motor driven by an invertor power supply source which can change the rotation speed of the motor.

I claim:

1. A method for controlling a compressor for a refrigerator, the compressor having a variable rotation speed, the method comprising the steps of:

comparing, during a predetermined time interval, a total number of openings of a freezing compartment door and a refrigerating compartment door and an accumulated time period of openings of the freezing compartment door and the refrigerating compartment door with a first and a second reference value, respectively;

maintaining the rotation speed of the compressor at a substantially constant value when both said accumulated time period of openings is not greater than said second reference value and said total number of openings is less than said first reference value; and, increasing the rotation speed of the compressor by a predetermined value when at least one of said accumulated time period of openings is greater than said second reference value and said total number of openings is not less than said first reference value.

2. The control method according to claim 1, further comprising the steps of:

counting an uninterrupted time interval of door closing when said accumulated time period of openings is not greater than said second reference value during said predetermined time interval and said total number of openings is less than said first reference value during said predetermined time interval; and, decreasing the rotation speed of the compressor by a second predetermined value when said uninterrupted time interval is greater than a second predetermined time interval.

3. A method for controlling a compressor for a refrigerator, the refrigerator having at least one cooling compartment, the compressor having a variable rotation speed, the method comprising the steps of:

detecting, during a predetermined time interval, a number of times that a door to the cooling compartment is opened and a cumulative time period that the door to the cooling compartment is opened;

increasing the rotation speed of the compressor when at least one of said number of times is greater than a first value and said cumulative time period is greater than a second value.

4. The method of claim 3, further comprising the step of:

decreasing the rotation speed of the compressor when the door to the cooling compartment remains closed throughout a second predetermined time interval.

\* \* \* \* \*